United States Patent Office 3,226,470
Patented Dec. 28, 1965

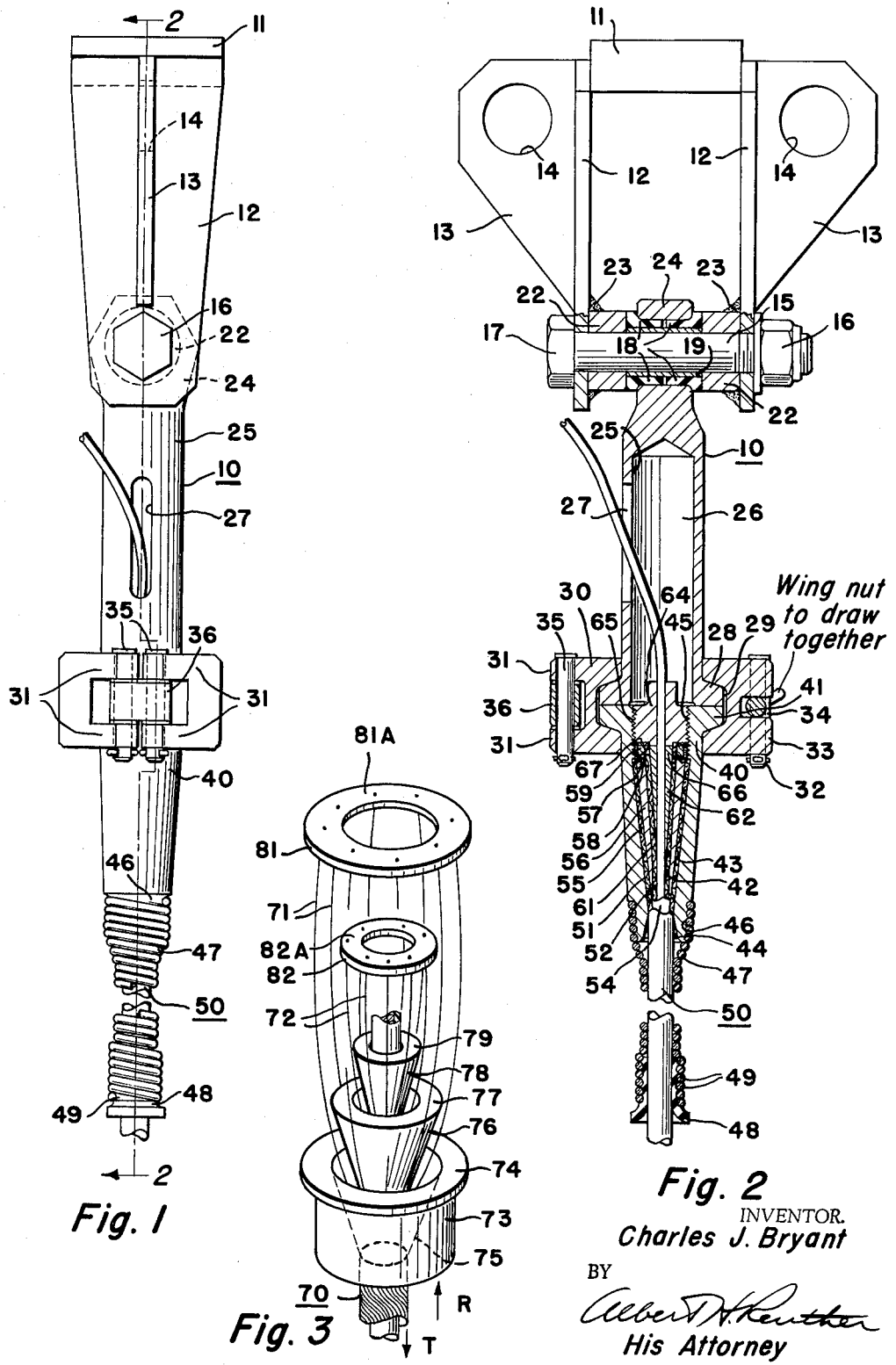

3,226,470
LOAD BEARING CONNECTOR
Charles J. Bryant, Santa Barbara, Calif., assignor to General Motors Corporation, Detroit, Mich., a corporation of Delaware
Filed Jan. 8, 1964, Ser. No. 336,592
2 Claims. (Cl. 174—79)

This invention relates to connector assembly, and, more particularly, to termination of external armored cable means subject to tensile loading.

A problem is encountered during installation of externally armored cable to secure outer wiring or braided shielding against loosening or separation and displacement of positioning therebetween. Therefore, it is an object of the present invention to provide a load bearing connector having a terminus stucture capable of transferring tensile loading forces to a multi-part housing assembly that reacts to absorb and bear such loading.

Another object of this invention is to provide a load bearing connector assembly having tapered sleeve means telescopically fitted into a mating housing as well as concentric ring means by which armor wiring is secured and held against axial displacement by tensile forces on armored cable.

Another object of this invention is to provide a terminus subassembly for use in securing externally armored cable having two concentric layers of wiring armor ends of which are expanded radially outwardly and secured to a pair of concentric armor installing rings subject to axial telescopic interfit of inner and outer armor jam sleeves each having a hollow interior and tapered outer periphery in mating relation to each other and an inner periphery of an enclosing body portion to which tensile forces are transferred by both the rings and tapered sleeves interacting therewith.

A further object of this invention is to provide a load bearing connector assembly for passage of a central conducting means including a yoke means for attachment to a support mounting and having a sleeve as well as pivotal bushing portion that bridges legs of the yoke means, a tube having an annular end journaled by the sleeve and bushing portion as well as a hollow laterally-opened central body and outwardly flared opposite end, a split clamp fitted for ready disconnecting over the flared end and a complementary mating end of a sleeve retaining housing means subassembled with internal first and second telescoping tapered sleeve portions having a sleeve retaining nut fitted to the housing means at one end thereof forcing a clamp ring portion against at least one of the tapered sleeve portions centrally hollow for conductor passage such that two concentric layers of armor wiring around the conductor can be held against tensile force by the tapered sleeve portions that interact with the housing means and clamp as tube supported.

Another object of this invention is to provide in combination, an armored cable having two concentric layers of shield wiring secured to ring means located radially outwardly from an axially expanded ending thereof, and multi-tapered sleeve portions telescopically fitted into each other as well as a corresponding outer housing means to be mounted to one side thereof for absorption of tensile forces applicable to the concentric wiring layers.

Further objects and advantages will be apparent from the following description, reference being had to the accompanying drawings wherein preferred embodiments of the present invention are clearly shown.

In the drawings:
FIGURE 1 is a plan view of an assembly in accordance with the present invention.
FIGURE 2 is a cross-sectional view taken along line 2—2 in FIGURE 1.

FIGURE 3 is an exploded perspective view of a subassembly also for use with structure of FIGURES 1 and 2.

FIGURES 1 and 2 of the drawings illustrate a load bearing connector assembly generally indicated by numeral 10 having features in accordance with the present invention. This assembly includes a yoke means or bracket 11 having a pair of legs 12 forming a bifurcated portion thereof reinforced by additional flange portions 13 extending laterally outwardly therefrom. The flange means 13 can each have an aperture 14 therethrough to receive suitable fastening devices fitted to a mounting panel such as on a seagoing vessel or ship as well as an oceanographic buoy means for which cable transmission lines are to be provided. Such transmission lines could be for signaling or receiving equipment in exploratory work and it is to be understood that any rigid cable connection would be unsatisfactory due to tensile stress and forces variable at all times on such cable or supply line means. Also considerable shielding is required and this must be maintained in proper positioning regardless of tensile forces encountered. Therefore, the yoke means 11 has assembled thereto additional structure.

This additional structure includes provision of a transverse anchoring or fastening means such as a bolt 15 fitted through suitable end aperturing of the legs 12 with a nut 16 threaded to one end thereof in a location opposite to a head 17. A pair of elastomeric bushing means 18 fitted radially outwardly on a sleeve 19 can be located centrally on this fastening device 15. Opposite annular spacers or metal members 22 can be secured to the legs 12 by brazing or welding 23 so as to be in axial alignment with aperturing through ends of the legs 12. These spacers 22 have a passage receiving the fastening means 15 and an annular end 24 of a tubular body portion 25 is journaled as to these elastomeric bushings 18. The tubular boy portion 25 has a hollow interior 26 as well as a lateral opening 27 to one side thereof in a central location as well as an opposite end flared outwardly with an annular flange portion 28 integral therewith.

This flange portion 28 fits into recessing 29 of a coupling or clamp means 30 having complementary bifurcated ends 31 on each of opposite portions thereof journaled to one side by a single pivot pin 32 which extends through dovetail interfitting portions 33 and 34 of the clamping sides as indicated in FIGURE 2. Upon closure of the clamping sides as to each other to form an annular recessing 29 there can be additional pin portions 35 which extend through the ends 31 suitably apertured and which pass also through a pair of passages in a double sleeve or coupling member 36. Suitable washers and end fastening means for the pins or pivots can be provided as indicated in the views of the drawings.

The coupling or clamp means 30 which the annular recessing 29 having tapered inner peripheral sides opposite to each other also receive additional components in mating relationship. Such additional components include telescopically fitted sleeve portions located radially inwardly from a sleeve retaining housing means 40 having a flared and radially outwardly flanged annular end 41 complementary to the flange 28 and recessing 29 to be in mating relationship therewith as best seen in FIGURE 2. It is to be noted that the mating relationship of the flange ends 28 and 41 as to the recessing 29 can permit no longitudinal pulling apart of the components and at most a limited turning about the axis thereof would be possible during installation.

The housing means 40 has a hollow interior 42 axially therethrough as well as a tapered inner surfacing 43 which flares outwardly to form a funnel entrance 44 at one end and which terminates adjacent to an opposite end having a cylindrical threaded portion 15. A plurality of progressive outer ribs 46 can be provided along outer periphery of the funnel end 44 such that one end of a metal spring means 47 can be spiraled and anchored thereon. An opposite end of such spring means 47 can be secured to a flared bushing 48 having recessing 49 similar to that indicated by reference numeral 46 and also adapted to have spring means 47 secured thereto. This spring means 47 fits concentrically around an armored cable means generally indicated by numeral 50.

The cable means per se as indicated by numeral 50 includes a first or outer braided wiring or shield portion 51 as well as a second or inner braided wire or shield portion 52 both surrounding a central conductor means 54 in a well known manner. Such inner and outer armored portions 51 and 52 previously could be loosened or displaced as to each other and as to the central conductor means 54 due to tensile forces and the like to which the armored cable means 50 becomes subjected during usage thereof. Therefore the housing means 40 includes additional components in accordance with the present invention for transfer of any loading or forces acting upon the inner and outer shielding indicated by numerals 51 and 52. The first or outer shielding portion 51 is spread laterally outwardly as indicated by reference numeral 55 so as to extend both radially and axially away from the central conductor means 54 which is maintained longitudinally and axially thereof. A first tapered sleeve portion 56 has an outer periphery extending substantially parallel to periphery 43 of the housing means 40. This outer periphery of the first sleeve portion 56 is thus substantially conical and concentric as to both the flared first shielding portion 55 and the inner periphery 43 of the housing means 40. An ending 57 of the first shield portion can be fitted radially inwardly between a rounded ending 58 of the first or outer sleeve means 56 being wedged thereagainst by a ring means 59. This ring means 59 includes an annular flange 60 which complements the rounded ending 58 of the first sleeve portion 56.

The second armored wiring portion 52 of the cable means 50 is also expanded laterally outwardly and axially into a flared portion 61 which is wedged or press fitted to a tapered inner periphery of the outer sleeve portion 56 due to telescopic interfit of the outer sleeve portion 56 and an inner sleeve portion 62 also having a tapered outer surfacing substantially parallel or concentric to the inner tapered surfacing of the outer sleeve portion 56. The inner or secondary sleeve portion 62 has a central cylindrical passage therethrough as does also a retaining means or nut 64 with threading 65 to complement threads 45 of one end of the housing means 40. This retaining means or nut 64 abuts against an annular end 66 of the inner or secondary sleeve portion 62 and an annular ending 67 of the inner wiring shield portion 52 can be wedged by the fastening clamp or nut means 64 against one side of ring means 59 and/or endings 66 of the inner tapered sleeve portion 62 as can be best seen in FIGURE 2. Thus the ring means 59 as well as the telescopically fitted inner and outer sleeve portions 62 and 56 respectively in mating relationship with each other as well as the housing means 40 can have any longitudinal forces of the concentric inner and outer shielding portions transmitted thereto as well as to the housing means 40 which is turn is anchored by the coupling 30 and additional components described earlier. There is sufficient clearance between the inner and outer tapered sleeves as well as the outer tapered sleeve and inner tapered surfacing of the housing means to permit wedging and press fitting of the inner and outer wiring shielding portions therebetween. The conductor means 54 passes unencumbered centrally therethrough and into the hollow interior 26 of the tubular portion 25 having the lateral opening 27 therein as indicated in FIGURE 2. The load bearing connector means of FIGURES 1 and 2 can be used with any externally armored cable means having two concentric layers of shielding made of hardened steel and the like as wiring surrounding a central electrical conductor means 54.

Referring to FIGURE 3 there is shown another embodiment of similar connector means that could be assembled to the structure of FIGURES 1 and 2. An armored cable means generally indicated by numeral 70 in FIGURE 3 have a first or outer wiring portion 71 as well as a second or inner wiring portion 72 and a central conductor in a usual manner which can be subjected to tensile force represented by an arrow with a reference identification "T." A housing means 73 can be provided with an outwardly flanged end 74 which would fit a coupling similar to that of FIGURES 1 and 2. The housing means has a tapered inner periphery 75 against which the first wiring shield portion 71 is forced by a tapered outer surfacing 76 of a first or outer tapered sleeve means 77, also has a predetermined angular relationship diverging from the central axis thereof at a rate differing from diversions of the outer surfacing of the first sleeve portion 77 such that an outer tapered surfacing 78 of an inner tapered secondary sleeve portion 79 will fit complementary in spaced and concentric relation thereto. The second wiring shield portion 72 is press fitted or wedged between the outer tapered surfacing 78 of the inner secondary sleeve portion 79 and the inner tapered surfacing of the first or outer tapered sleeve portion 77. A first annular ring means 81 can have aperturing 81A therethrough for installing and anchoring outer armor wiring shield portion 71 at endings thereof. Similarly a second or inner concentric ring means 82 can be provided with aperturing 82A therethrough for installing and anchoring inner armor wiring shield portion 72 at endings thereof. The ring means 81 and 82 can be caused to abut the flange portion 74 of housing means 73 upon telescopic and mating interfit of the inner and outer tapered sleeve portions as to the housing portion 73 in a manner similar to that illustrated in FIGURE 2. The inner and outer tapered sleeve portions 77 and 79 are jammed telescopically together and the paper of the inner sleeve portion can increase at an annular relationship of substantially 7° so far as outer surfacing thereof is concerned and the outer surfacing of the outer sleeve portion can have an incremental and progressive increasing taper at an angular relation of substantially 14°. Load bearing connector structures disclosed herein can be used with armored cable means rated at 14,000 pounds and connector assemblies illustrated has sustained a load of 15,000 pounds as a terminus adaptable to externally armored cable and capable of bearing the tensile load applied at the cable means as represented by the arrow "T" and reacted at housing means 73 for example as represented by arrows indicated by reference "R" in FIGURE 3.

It is to be understood that the use of two ring means 81 and 82 made of rigid material such as steel can involve brazing or otherwise holding the wiring ends thereto. Once the wiring is installed as to such ring means a further fastening such as the nut means 64 in FIGURE 2 can be provided for retaining the inner and outer tapered sleeve portions as well as the ring means in functional relationship similar to that illustrated in the sectional view of FIGURE 2. During loading the wiring shield portions are gripped between the housing means and the outer armor sleeve portion as well as the internal armor sleeve portion as noted.

While the embodiments of the present invention as herein disclosed constitute preferred forms, it is to be understood that other forms might be adopted.

What is claimed is as follows:

1. A load bearing connector assembly for passage of a central conducting means having two concentric layers of shield wiring thereon, comprising, a yoke means for attachment to a support mounting, a sleeve and pivotal bushing portion carried by said yoke means, a tubular body portion having one end thereof journaled by said sleeve and bushing portion as well as having a lateral opening through which the conducting means passes an outwardly flared end on said tubular body portion in a location remote from said journaling end, a separable clamp means which forms internal recessing that receives said flared end, a housing means having an outwardly flanged ending which fits said clamp means recessing in complementary relation to said flared end of said tubular body portion, internal first and second telescoping tapered sleeve portions for flaring shield wiring outwardly as fitted complementary to each other and axially into alignment with said housing means in a location to one side of said tubular body portion, ring means to engage ending of shield wiring in abutment against said telescoping tapered sleeve portions in a location radially within confines of said housing means, and fastening means to force said tapered sleeve portions to interact with said housing means and that maintain assembled relationship thereof.

2. The assembly of claim 1 wherein said housing means has a funnel entrance in a location axially remote from said fastening means and a spiral spring means is fitted peripherally outwardly from said funnel entrance on said housing means resiliently engaged thereby as well as for surrounding the conducting means having the two concentric layers of shield wiring.

References Cited by the Examiner

UNITED STATES PATENTS

| | | | |
|---|---|---|---|
| 1,392,480 | 10/1921 | Clarke | 24—126 |
| 1,824,005 | 9/1931 | Astley | 24—122 |
| 1,863,021 | 6/1932 | Matthes | 24—122 X |
| 2,276,049 | 3/1942 | Leighton | 287—20 |
| 2,564,302 | 8/1951 | Fraser. | |
| 2,848,776 | 8/1958 | Campbell | 24—126 |
| 3,072,986 | 1/1963 | Jugle et al. | 174—94 X |

FOREIGN PATENTS

| | | |
|---|---|---|
| 1,114,564 | 4/1902 | France. |
| 62,220 | 6/1955 | France. |
| 718,418 | 2/1942 | Germany. |
| 851,508 | 10/1960 | Great Britain. |
| 928,336 | 6/1963 | Great Britain. |

ROBERT K. SCHAEFER, *Primary Examiner.*

JOHN F. BURNS, *Examiner.*

WILLIAM F. FREDERICKS, JOSEPH F. RUGGIERO, *Assistant Examiners.*